(12) United States Patent
Cabral (10) Patent No.: US 9,987,837 B2
(45) Date of Patent: Jun. 5, 2018

(54) ADHESIVE FILM REMOVER

(71) Applicant: Cybele Studio Pte Ltd, Singapore (SG)

(72) Inventor: Gilberto Cabral, Singapore (SG)

(73) Assignee: ORIBEL PTE LTD, Singapore (SG)

( * ) Notice: Subject to any disclaimer, the term of this patent is extended or adjusted under 35 U.S.C. 154(b) by 0 days. days.

(21) Appl. No.: 14/854,306

(22) Filed: Sep. 15, 2015

(65) Prior Publication Data

US 2017/0072676 A1    Mar. 16, 2017

(51) Int. Cl.
| | | |
|---|---|---|
| *B32B 38/10* | (2006.01) | |
| *B32B 43/00* | (2006.01) | |
| *B26B 27/00* | (2006.01) | |

(52) U.S. Cl.
CPC .......... *B32B 43/006* (2013.01); *B26B 27/002* (2013.01); *B32B 38/10* (2013.01); *B32B 2607/00* (2013.01); *Y10T 83/472* (2015.04); *Y10T 83/9292* (2015.04); *Y10T 156/1184* (2015.01); *Y10T 156/1961* (2015.01); *Y10T 156/1967* (2015.01)

(58) Field of Classification Search
CPC . B32B 32/10; B32B 43/006; Y10T 156/1184; Y10T 156/1961; Y10T 156/1967; Y10T 83/472; Y10T 83/9292
USPC ..... 156/761, 762, 717; 83/307.1, 580, 651.1
See application file for complete search history.

(56) References Cited

U.S. PATENT DOCUMENTS

| | | | |
|---|---|---|---|
| 1,142,811 A | 6/1915 | Griswold | |
| 1,407,955 A | 2/1922 | Smalley | |
| 1,540,246 A * | 6/1925 | Blassie | A01J 23/00 30/117 |
| 1,623,288 A * | 4/1927 | Topinka | B26D 1/547 409/903 |
| 1,796,212 A * | 3/1931 | Nadeo | A01J 23/00 30/116 |
| 2,158,667 A * | 5/1939 | Rieck | B26D 1/553 206/216 |
| 2,380,855 A | 7/1945 | Lower | |
| 2,982,987 A | 5/1961 | Knapp | |
| 3,096,582 A * | 7/1963 | Mueller | A01J 25/06 29/522.1 |
| 3,821,916 A * | 7/1974 | Ricci | B26D 1/547 83/200.1 |
| 3,899,157 A | 8/1975 | Thomas | |

(Continued)

OTHER PUBLICATIONS

Sherril mud tools; https://web.archive.org/web/20140208045152/http://www.clay-king.com/mudlist.htm; Feb. 8, 2014.*

*Primary Examiner* — Mark A Osele
*Assistant Examiner* — Nickolas Harm
(74) *Attorney, Agent, or Firm* — Mark F. Smith; Smith Brandenburg Ltd.

(57) ABSTRACT

The subject invention is directed to a device and method for removing an article attached to a mounting surface by an adhesive mounting. Preferably, the device comprises a first grip, a second grip and a filament having a first end attached to the first grip and a second end attached to the second grip. The filament operates such that when placed between the mounting surface and the adhesive mounting and pulled by the first and second grip in a direction along a bonding plane, it operates to separate the adhesive mounting from the mounting surface.

2 Claims, 6 Drawing Sheets

(56) References Cited

U.S. PATENT DOCUMENTS

| | | | |
|---|---|---|---|
| 4,125,047 A * | 11/1978 | Martin | B28B 17/0045 |
| | | | 83/581.1 |
| 4,311,073 A * | 1/1982 | Brugger | B28B 11/16 |
| | | | 264/157 |
| 4,646,602 A * | 3/1987 | Bleick | B26D 1/553 |
| | | | 30/117 |
| 4,652,163 A | 3/1987 | Karliner et al. | |
| 5,788,104 A | 8/1998 | Hoyt | |
| 6,244,773 B1 | 6/2001 | Gerernia-Nargi | |
| 8,141,611 B2 * | 3/2012 | Lai | B23D 49/02 |
| | | | 156/701 |
| 2005/0278957 A1 * | 12/2005 | McCullough | B26B 27/002 |
| | | | 30/279.6 |
| 2011/0113938 A1 * | 5/2011 | Felton | A01J 27/04 |
| | | | 83/13 |
| 2013/0333534 A1 * | 12/2013 | Votolato | B26B 27/002 |
| | | | 83/13 |

* cited by examiner

ADHESIVE FILM REMOVER

TECHNICAL FIELD

This invention relates to an adhesive film remover, and more particularly, to a mechanical adhesive film remover that is effective for removing a substrate having an adhesive film thereon for attaching to a surface.

BACKGROUND OF THE INVENTION

Decorative articles, such as wall ornaments, are often applied to various mounting surfaces, such as walls, using permanent and semi-permanent mountings such as adhesives, nails, screws, tacks and the like. Other types of mountings have been developed for attaching articles to mounting surfaces using non-permanent (removable) and/or re-usable adhesives. Such adhesive mountings often comprise a film substrate having a first surface that may be decorated or has a rigid component attached to the article and a second surface having a removable and/or reusable adhesive covered by a release sheet. In attaching the article to a mounting surface, the release sheet is peeled off and the article is placed against the mounting surface such that the adhesive bonds with the mounting surface thereby securing the article in position.

Various non-permanent and/or re-usable adhesives have been developed that are effective for use with polymers or paper for making annotations and provide an adhesive bond with the mounting surface that permits easy removal of the article from the mounting surface without causing damage to the mounting surface. Unfortunately, such adhesives generally do not have the bonding strength for attaching larger and heavier articles to a mounting surface. Accordingly, non-permanent and/or re-usable adhesives have also been developed that provide the necessary adhesive strength for use in attaching heavier articles to a mounting surface. Unfortunately, such non-permanent and/or re-usable adhesives while allowing the article to be detached from the mounting surface, they often cause damage to the mounting surface when the article is being removed.

Another problem associated with the use of adhesive mountings is that the adhesive often begins to dry over time thereby reducing the ability for easy detachment of the article from the mounting surface. This is particularly true after the adhesive has been in contact with the mounting surface for a significant amount of time.

Heavier articles requiring more or adhesive mountings having greater contact surface areas are often removed from the mounting surface by peeling back an edge of the adhesive mounting and pulling outwardly away from the mounting surface to separate the adhesive mounting from the mounting surface. This peeling process often results in damage to the mounting surface and the likelihood of such damage is increased if the peeling process is performed too quickly or if the article is relatively rigid thereby reducing the ability of the adhesive mounting to bend during removal.

Accordingly, it would be desirable for a method and device that can effectively remove an article attached to a mounting surface by an adhesive mounting; that minimizes or reduces the likelihood of damaging the mounting surface during removal; that is simple to operate; and relatively inexpensive to manufacture.

SUMMARY OF THE INVENTION

A device for removing an article attached to a mounting surface by an adhesive mounting, the device comprising a first grip and a second grip and a filament having a first end attached to the first grip and a second end attached to the second grip. Wherein, the filament operates such that when placed between the mounting surface and the adhesive mounting it can be pulled by the first and the second grips in a direction along a bonding plane to separate the adhesive mounting from the mounting surface.

In a preferred embodiment of the invention the filament is formed from a material having relatively good tensile strength and relatively good tear strength.

In a preferred embodiment of the invention the filament is formed from a material having a tensile strength and tear strength of about that of a filament of equal dimensions formed from a fluorocarbon.

In a preferred embodiment of the invention the filament is formed from a polymeric material.

In a preferred embodiment of the invention the filament is formed from a polyethylene.

In a preferred embodiment of the invention the filament of formed from a fluorocarbon.

In a preferred embodiment of the invention the filament is formed from a fiber material.

In a preferred embodiment of the invention the filament is formed from a braided material.

In a preferred embodiment of the invention the filament is formed from a twisted material.

In a preferred embodiment of the invention the filament is formed from a waxed fiber material.

In a preferred embodiment of the invention the filament has a diameter of about 0.13 mm to about 0.5 mm.

In a preferred embodiment of the invention the filament has a break strength of more than about 9 kg (20 lbs).

In a preferred embodiment of the invention the filament has a break strength of more than about 18 kg (40 lbs).

In a preferred embodiment of the invention the grips are formed from a plastic.

In a preferred embodiment of the invention the grips are formed from wood.

In a preferred embodiment of the invention the grips are formed from an elastomer.

In a preferred embodiment of the invention the grips are formed from metal.

In a preferred embodiment of the invention the first grip and the second grip each comprising a planar portion having a first opening and a second opening wherein the first opening in the first grip operates to allow a user to grip the first grip by inserting a finger through the first opening in the first grip and wherein the first opening in the second grip operates to allow a user to grip the second grip by inserting a finger through the first opening in the second grip.

In a preferred embodiment of the invention the first grip and the second grip each comprises a second opening for attaching one end of the filament.

In another preferred embodiment of the invention the first grip and the second grip each comprising an elongated strip with a planar portion and a longitudinally extending slide portion, the slid portion having a longitudinally extending slit for receiving and securing one end of the filament.

In a preferred embodiment of the invention the planar portion of the elongated strip of each grip operates to allow a user to hold the grip and the slide portion operates to allow a user to apply a force to the grip using the user's thumb.

A preferred embodiment of the invention is a method of removing an adhesive mounting, comprising the steps of a user gripping a first grip and a second grip having a filament there between; placing the filament between a mounting surface and the adhesive mounting; moving the first and second grip in a direction along a bonding plane to separate the adhesive mounting from the mounting surface.

These and other features, aspects, and advantages of the present invention will become better understood with regard to the following description, appended claims, and accompanying drawings.

BRIEF DESCRIPTION OF THE DRAWINGS

To provide a more complete understanding of the present invention and further features and advantages thereof, reference is now made to the following description taken in conjunction with the accompanying drawings, in which:

FIG. 2 is a perspective schematic view of the device of FIG. 1 showing a user holding the first and second grips with the filament stretched there between.

FIG. 5 is a perspective schematic view of the device of FIG. 4 showing a user holding first and second grips with the filament stretched there between.

DETAILED DESCRIPTION OF THE INVENTION

The subject invention is directed to a device and method for removing an article attached to a mounting surface by an adhesive mounting. In a preferred embodiment of the invention, the device comprises a first grip, a second grip and a filament having a first end attached to the first grip and a second end attached to the second grip. The filament operates such that when placed between the mounting surface and the adhesive mounting and pulled by the first and second grips in a direction along a bonding plane, it operates to separate the adhesive mounting from the mounting surface. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 1:
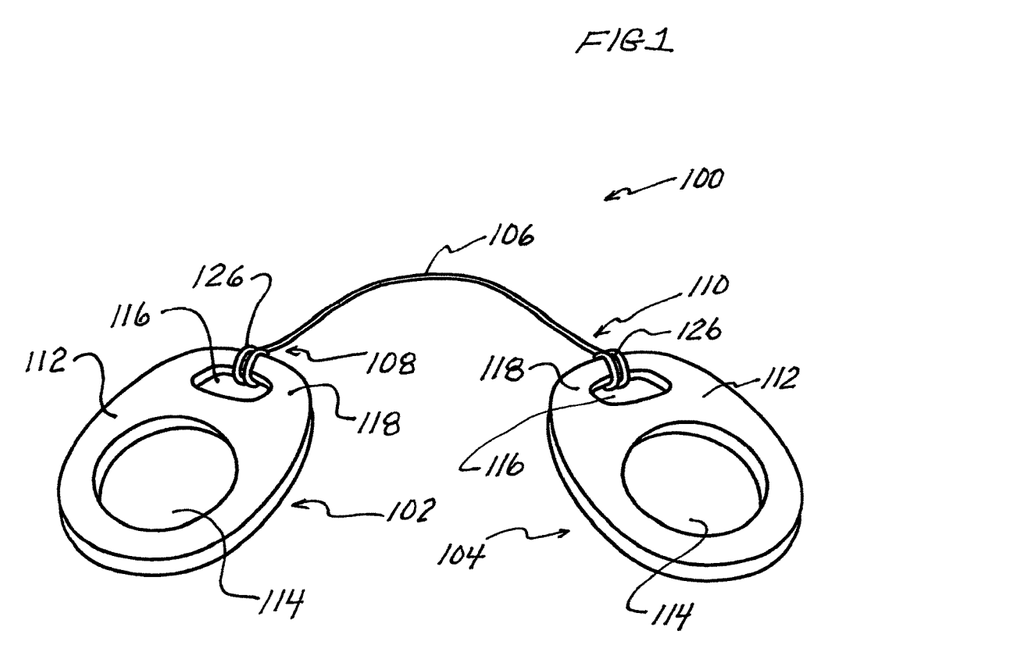
FIG. 1 is a perspective schematic view of a preferred embodiment of a device for removing an article attached to a mounting surface by an adhesive mounting, showing a first grip and a second grip and a filament connected to the first and second grips.
Figure 2:
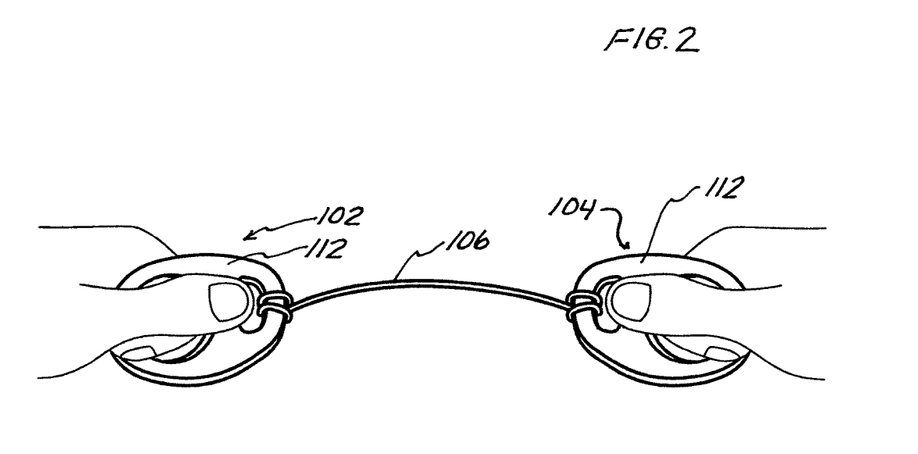

Referring to FIGS. 1 and 2, a preferred embodiment of a device for removing an article to a mounting surface 100 is shown having a first grip 102 and a second grip 104 and a filament 106 having a first end 108 attached to the first grip 102 and a second end 110 attached to the second grip 104. Preferably, the filament 106 is removably attached to the first grip 102 and the second grip 104, but it should be understood that the filament could be permanently attached to the grips. It should also be understood that the length of the filament can be varied by attaching a filament of a different length or by attaching the filament to provide different lengths, such as winding the filament around a portion of one or both grips. Preferably, the grips 102, 104 are formed from a material such as a plastic material. In another preferred embodiment of the invention the grips are formed from wood, an elastomer, metal, or other such material.

In a preferred embodiment of the invention the filament 106 is formed from a material having relatively good tensile strength and relatively good tear strength. Preferably, the filament has a diameter of about 0.13 mm to about 0.5 mm and has a break strength of 9 kg (20 lbs) to about 18 kg (40 lbs). In a preferred embodiment, the filament is formed from a polymeric material, such as a polyethylene or a polyamide. In another preferred embodiment of the invention the filament is formed from a fluorocarbon. In another preferred embodiment of the invention the filament is formed from a fiber material. In another preferred embodiment of the invention the filament is formed from a braided material or a twisted material. In another preferred embodiment of the invention is formed from a waxed fiber material.

As shown in FIGS. 1 and 2, in a preferred embodiment of the invention the first grip 102 and the second grip 104 each include a generally oval shaped planar portion or disk 112 having a first opening 114 and a smaller second opening 116 with a filament attachment portion 118 for attaching to one end 108, 110 of the filament 106. As illustrated in FIG. 2, the planar portion 114 operates to allow a user to grip the first and second grips 102, 104 by inserting a finger through the first opening 114 of each grip with the user's thumb resting against the planar portion 112 to permit guidance and easy use of the device 100. In a preferred embodiment of the invention smaller second opening 116 of the first grip 102 and the second grip 104 each operate to permit receiving and removably securing one end 108, 110 of the filament 106, such as by use of a convention knot 126. It should be understood that other methods of permanently or removably attaching an end of the filament can also be used. In operation, as illustrated in FIGS. 1-3 and 6, the device 100 for removing an article A from a mounting surface S is shown whereby a user gripping the planar portion 112 of the first grip 102 in one hand and the planar portion 112 of the second grip 104 such that the user's fingers are inserted into corresponding first openings 114 of each grip 102, 104. The filament 106 is then placed between a mounting surface S and the adhesive mounting M and the grips 102, 104 are moved in a direction along a bonding plane P to separate the adhesive mounting M from the mounting surface S.

Figure 4:
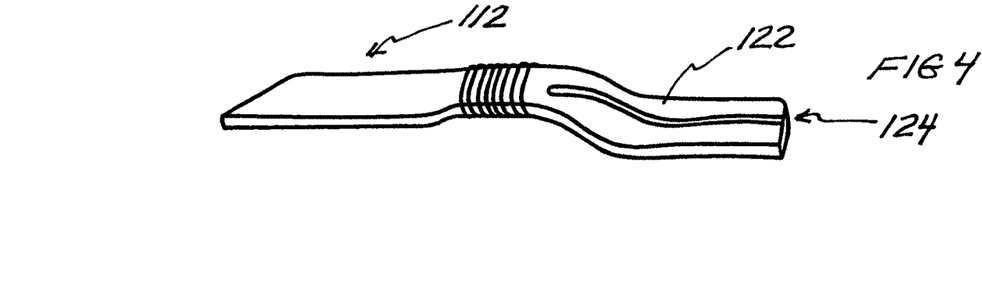
FIG. 4 is a perspective schematic view of another preferred embodiment of a device for removing an article attached to a mounting surface by an adhesive mounting, showing a grip and a filament attaches to the grip.
Figure 5:
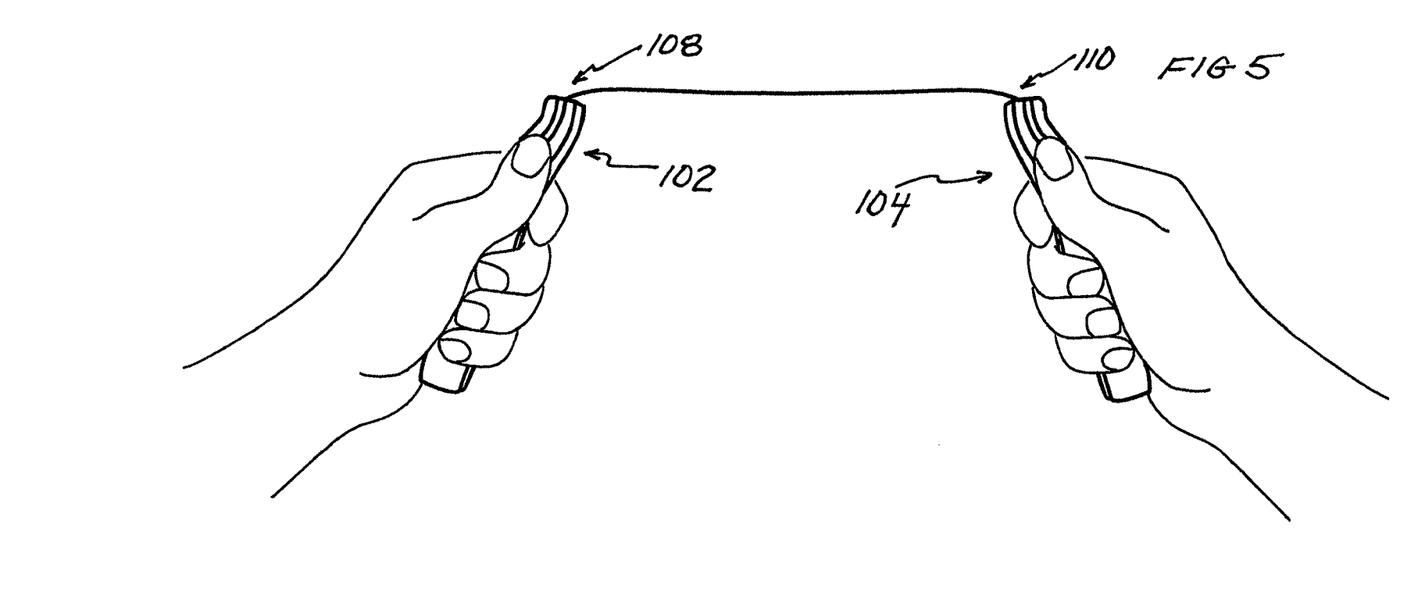

In another preferred embodiment of the invention, as illustrated in FIGS. 4 and 5, the first grip 102 and the second grip 104 each include an elongated strip 112 having an elongated planar portion 120 and a slide portion 122 with a filament attachment portion 118 for attaching to one end 108, 110 of the filament 106. As shown in FIG. 5, the planar portion 120 of the elongated strip 112 of each grip 102, 104 operate to allow a user to hold the planar portion 120 to grip the first and second grips 102, 104 and the slide portion 122 operates to allow a user to apply a force to the grip 102, 104 using the user's thumb. In a preferred embodiment of the invention slide portion 122 of the first grip 102 and the second grip 104 each comprise a longitudinally extending slit 124 for receiving and securing one end 108, 110 of the filament 106. As shown, preferably each end 108, 110 includes a knot 126 for preventing the end 108, 110 from slipping through the slit 124 thereby maintaining the attachment of the filament to the grips 102, 104. It should be understood that the use of a slit 124 and knot 126 allows for easy removal and/or replacement of the filament. It should also be understood that other attachment systems can be utilized for permanently or non-permanently attaching the filament to the grips.

Figure 3:
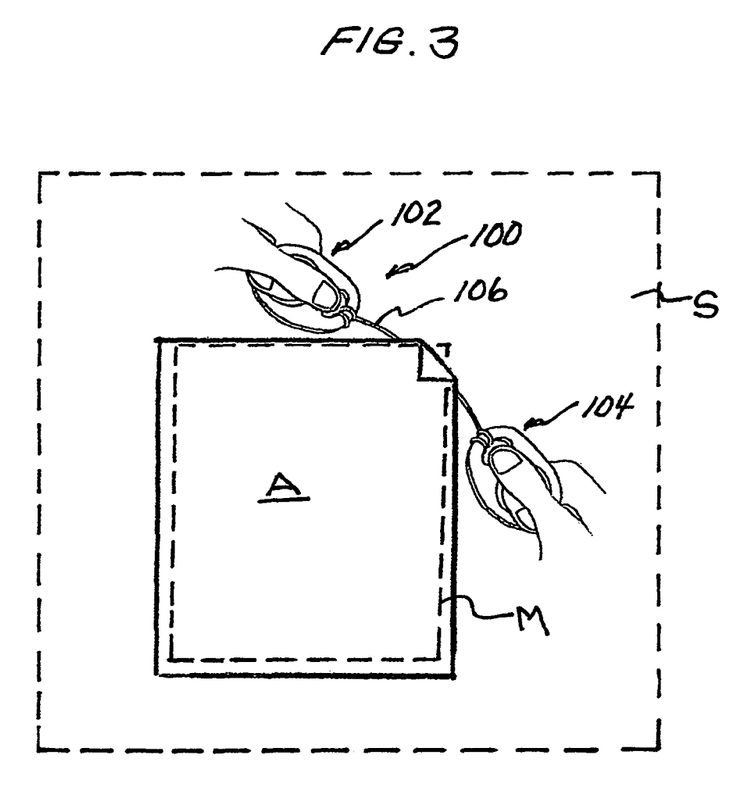
FIG. 3 is a perspective schematic view showing an article attached to a mounting surface by an adhesive mounting and being removed by a device of the subject invention.
Figure 6:
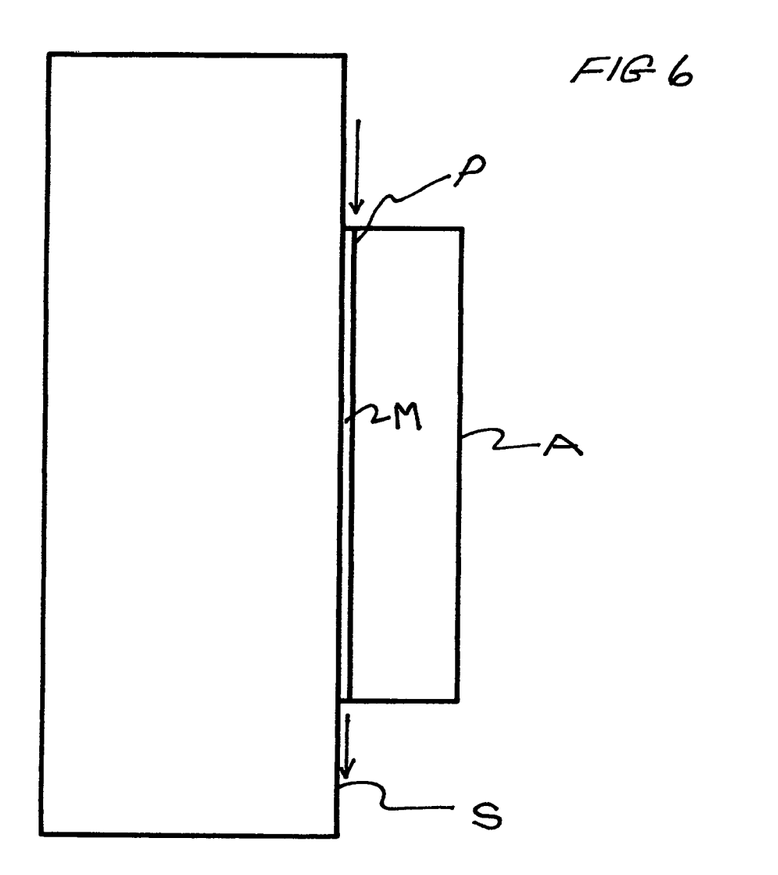
FIG. 6 is a side schematic view showing an article mounted to a mounting surface by an adhesive mounting.

In operation, the device 100 for removing the article A from the mounting surface S is shown whereby a user gripping the planar portion 120 of the first grip 102 in one hand and the planar portion 120 of the second grip 104 such that the user's thumbs are pressing against the slide portion 122 of each grip. The filament 106 is then placed between a mounting surface S and the adhesive mounting M and the grips 102, 104 are moved in a direction along a bonding plane P to separate the adhesive mounting M from the mounting surface S (FIGS. 3 and 6).

Figure 7:
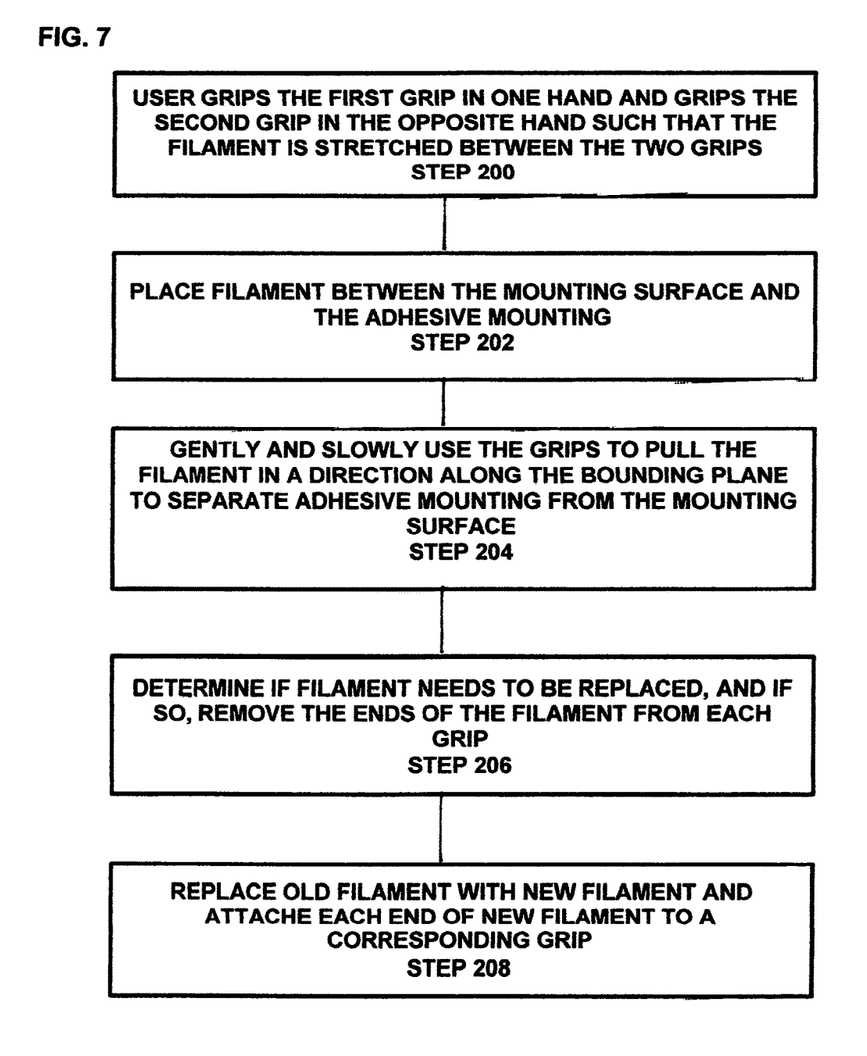
FIG. 7 is an illustration showing the steps for performing a method of a preferred embodiment of the invention.

A preferred embodiment of the invention is a method of removing an article attached to a mounting surface by an adhesive mounting and is illustrated in FIG. 7. Preferably, a user grips the first grip in one hand and grips the second grip in the opposite hand such that the filament is stretched between the two grips (step 200). The filament is placed between the mounting surface and the adhesive mounting (step 202) and the user gently and slowly uses the grips to pull the filament in a direction along the bounding plane (step 204) to separate the adhesive mounting from the mounting surface. In the event the filament needs to me changed, the user removes the ends of the filament from each grip (step 206) and replaces the filament with a new filament and attaches each end of the new filament to a corresponding grip (step 208).

It has been surprisingly found that by moving the filament along the bonding plane operates to separate the adhesive mounting from the mounting surface in a relatively quickly and with a minimal amount of damage to the mounting surface. It has also been surprisingly found that the method of the subject invention as described herein effectively operates to separate an adhesive mounting having dried or semi-dried adhesive with a minimal about of damage to the mounting surface.

It should now be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. A device for removing an article attached to a mounting surface by an adhesive mounting, the device consisting of:
   a first grip and a second grip and a filament having a first end fixedly attached to said first grip and a second end fixedly attached to said second grip;
   wherein said first grip has a planar portion that operates to allow a user to grip said first grip with one hand and said second grip has a planar portion that operates to allow the user to grip said second grip with another hand;
   wherein said filament operates such that when placed between the mounting surface and the adhesive mounting it can be pulled by said first and said second grip in a direction along a bonding plane to separate the adhesive mounting from the mounting surface and minimize damage to the mounting surface; and
   wherein said planar portion of said first grip and said planar portion of said second grip each have an elongated strip and a longitudinally extending slide portion, said slide portion with a longitudinally extending slit for receiving and securing one end of said filament.

2. A device for removing an article attached to a mounting surface by an adhesive mounting, the device consisting of:
   a first grip and a second grip and a filament having a first end fixedly attached to said first grip and a second end fixedly attached to said second grip;
   wherein said first grip has a planar portion that operates to allow a user to grip said first grip with one hand and said second grip has a planar portion that operates to allow the user to grip said second grip with another hand;
   wherein said operates such that when placed between the mounting surface and the adhesive mounting it can be pulled by said first and said second grip in a direction along a bonding plane to separate the adhesive mounting from the mounting surface and minimize damage to the mounting surface; and
   wherein said planar portion of said first grip and said second grip each include an elongated strip and a slide portion, wherein each said elongated strip operates to allow a user to hold said grip and wherein each said slide portion operates to allow a user to apply a force to each said grip using the user's thumb.

* * * * *